Aug. 15, 1967  J. PICKLES  3,335,995
SECTOR TYPE SEAT ADJUSTER
Filed Jan. 11, 1965  2 Sheets-Sheet 1

INVENTOR.
JOSEPH PICKLES
BY Whittemore,
Hulbert & Belknap
ATTORNEYS

Aug. 15, 1967   J. PICKLES   3,335,995
SECTOR TYPE SEAT ADJUSTER
Filed Jan. 11, 1965   2 Sheets-Sheet 2
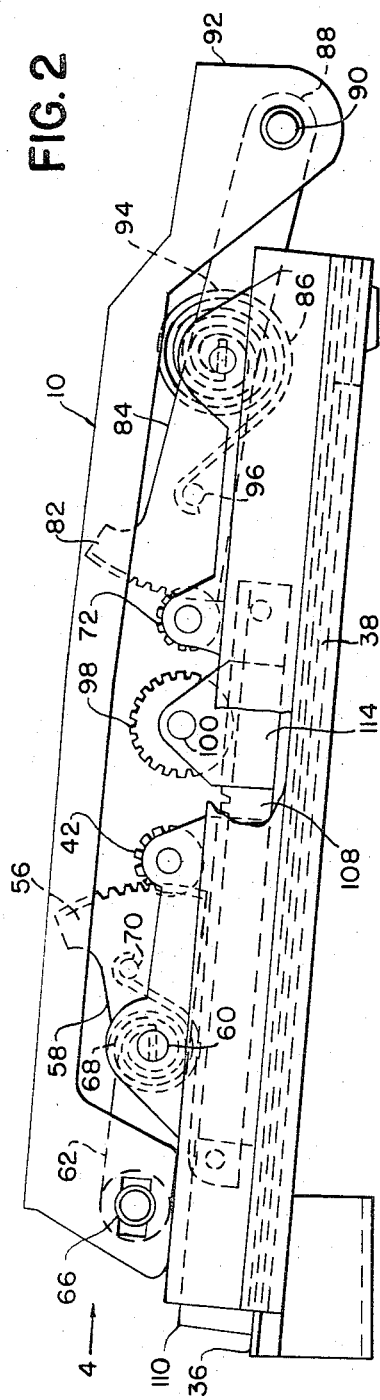
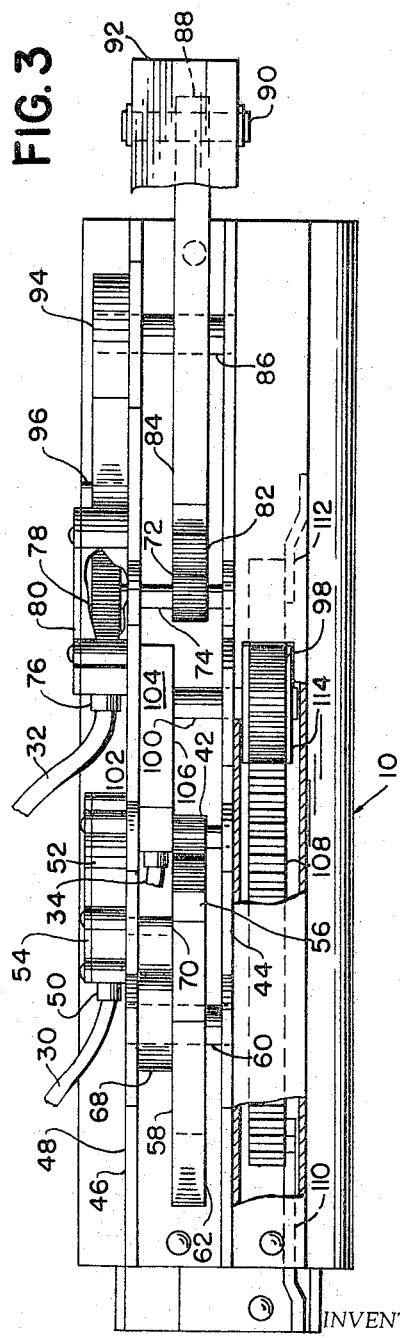
INVENTOR.
JOSEPH PICKLES
BY *Whittemore,*
*Hulbert & Belknap*
ATTORNEYS United States Patent Office 3,335,995
Patented Aug. 15, 1967

3,335,995
SECTOR TYPE SEAT ADJUSTER
Joseph Pickles, Dearborn, Mich., assignor to Ferro Manufacturing Corporation, a corporation of Michigan
Filed Jan. 11, 1965, Ser. No. 424,620
10 Claims. (Cl. 248—394)

The invention relates to seat adjuster mechanism and refers more specifically to improved mechanical structure for selectively moving a seat supported thereby up and down in the front, up and down in the rear and forward and backward.

In the past wherein seat adjuster mechanism has been provided capable of selective movement of the front and rear of a seat up and down, and forward and backward movement of the seat, the mechanical structure thereof has been particularly complicated and consequently expensive. In addition, in prior structures direct drive of separate means for moving the seat in the required directions has either not been provided or has added to the complexity of the seat adjuster mechanism.

It is therefore an object of the invention to provide improved mechanical structure for seat adjuster mechanism.

Another object is to provide mechanical structure for seat adjuster mechanism including separate direct drive mechanisms for producing up and down movement of both the front and rear of a seat mounted thereon and forward and backward movement of the seat.

Another object is to provide mechanical structure as set forth above wherein the drive mechanism for moving the seat up and down in the front comprises a direct driven pinion and a pivotally mounted sector in engagement therewith and pivotally connected to the front of the seat.

Another object is to provide mechanical structure as set forth above wherein the drive mechanism for moving the seat up and down in the rear comprises a direct driven pinion and a pivotally mounted sector in engagement therewith and pivotally connected to the rear of the seat.

Another object is to provide mechanical structure for seat adjuster mechanism as set forth above wherein the drive mechanism for moving the seat forward and backward comprises a direct driven pinion movable forward and backward with said seat and a rack stationary with respect to said seat engaged with said pinion.

Another object is to provide mechanical structure for seat adjuster mechanism as set forth above wherein the pinion engaged with the rack is held in alignment with the rack by means of a saddle surrounding the rack and mounted at the axis of rotation of the pinion.

Another object is to provide mechanical structure for seat adjuster mechanism which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 2 is a side elevation of the mechanical structure illustrated in FIGURE 1 taken in the direction of arrow 2 in FIGURE 1.

FIGURE 3 is a partially broken away top view of the mechanical structure illustrated in FIGURE 2.

With particular reference to the figures of the drawings, one embodiment of the mechanical structure 10 of the seat adjuster mechanism 12 constructed in accordance with the invention will now be disclosed in detail.

Figure 1:
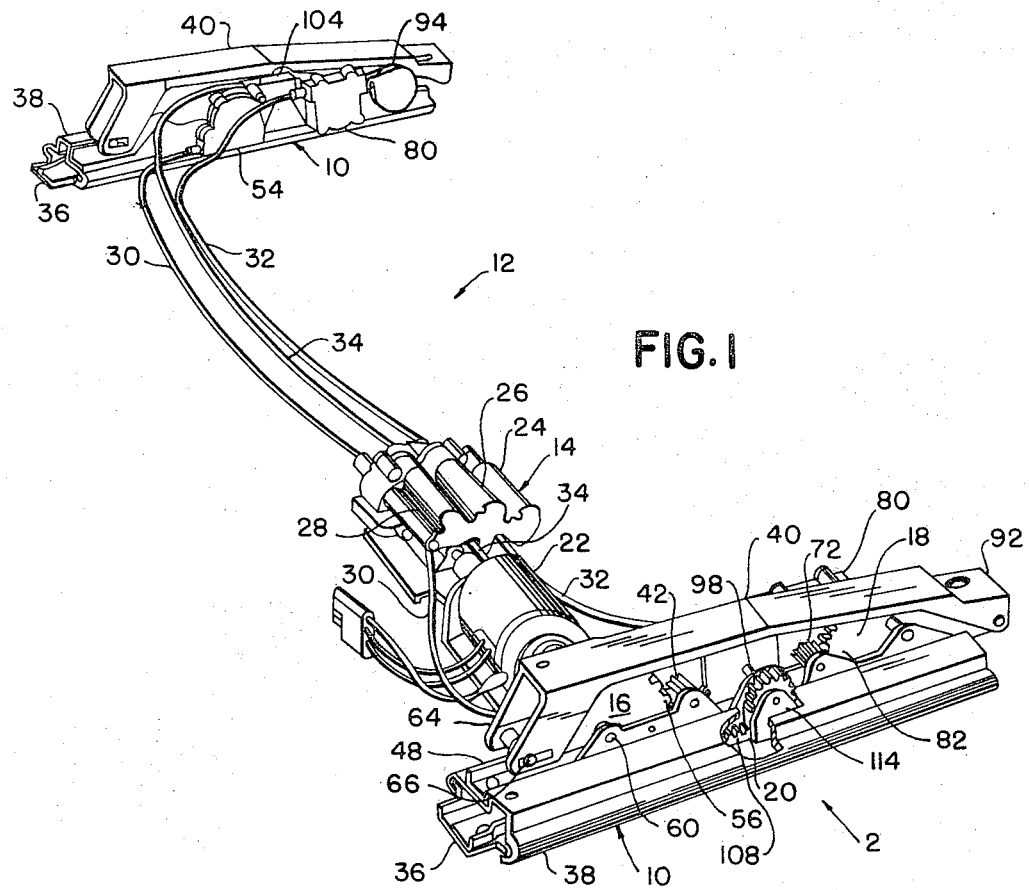
FIGURE 1 is a perspective view of seat adjuster mechanism including mechanical structure constructed in accordance with the invention.
Figure 4:
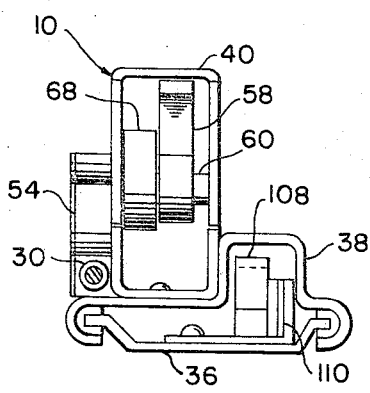
FIGURE 4 is an end view of the mechanical structure illustrated in FIGURE 1 taken in the direction of arrow 4 in FIGURE 2.

The seat adjuster mechanism 12, illustrated best in FIGURE 1, includes the electrically actuated driving apparatus 14 connected to the mechanical structure 10 which may be positioned at the opposite edges of a seat to be adjusted thereby in the usual manner for vehicle seat adjuster mechanisms. The mechanical structure 10 includes separate direct drive mechanisms 16, 18 and 20 for producing movement of the front of a seat connected thereto in an up and down direction for producing movement of the rear of the seat in an up and down direction and for moving the seat horizontally forward and backward respectively.

In operation the motor 22 of the driving apparatus 14 is energized in a predetermined direction along with one or more of the solenoid actuated clutches 24, 26 and 28 to provide drive in the proper direction to the separate direct drive mechanisms 16, 18 and 20 to produce required movement of a seat connected to the mechanical structure.

More specifically the driving apparatus 14 may include any of a plurality of well known single motor multiple drive units capable of selectively producing rotation of flexible cables 30, 32 and 34 in opposite directions. One such single motor multiple drive unit is fully disclosed in United States Patent No. 2,886,094. The details of the driving apparatus 14 will not therefore be considered in further detail herein.

The mechanical structure 10 includes a track 36 which may be secured to the floor of an automobile in the usual manner and a slide 38 movable longitudinally of the track in accordance with the driving of the mechanism 20 for moving a seat secured to the seat supporting member 40 in a forward and backward direction. The mechanisms 16, 18 and 20 for moving the front and rear of the seat up and down and for moving the seat forward and backward are supported on the slide 38 and in turn support the seat supporting member 40 and are connected to the flexible drive cables 30, 32 and 34, respectively.

The direct drive mechanism 16 for moving the front of the seat up and down includes a pinion 42 supported for rotation between flanges 44 and 46 of member 48 secured to the slide 38 by convenient means (not shown). The pinion 42 is driven in rotation in accordance with the rotation of flexible cable 30 through a worm 50 and worm gear 52 in gear box 54. The pinion 42 is in driving engagement with the toothed portion 56 of a sector 58 pivotally mounted on pivot pin 60 between the flanges 44 and 46 of member 48. The end 62 of sector 58 is connected to the end 64 of the seat supporting member 40 by the lost motion pivot structure 66. A counterbalance spring 68 is secured to the pivot pin 60 at one end and engages the spring pin 70 at the other end.

The direct drive mechanism 18 for moving the seat up and down in the rear is similar to the structure 16 for moving the seat up and down in front. The structure 18 thus includes a pinion 72 mounted for rotation on shaft 74 between the flanges 44 and 46 of member 48 which pinion is directly driven through flexible cable 32, worm 76 and worm gear 78 in gear box 80. Again the toothed portion 82 of the sector 84 is engaged with the pinion 72 and the sector 84 is pivotally mounted on the pivot pin 86 between the flanges 44 and 46 of the member 48. The end 88 of sector 84 is however directly pivoted by means of pivot pin 90 to the end 92 of the seat supporting member 40 without a lost motion connection therebetween. Again a counterbalance spring 94 is secured to the pivot pin 86 at one end and engages the spring pin 96 at the other end.

The direct drive mechanism 20 for moving a seat supported on the seat supporting member backward and forward again includes a pinion 98 supported for rotation on the shaft 100 between the flanges 44 and 46 of the member 48. The shaft 100 is directly driven from flexible cable 34 through a worm 102 and worm gear 104 in gear box 106. The pinion 98 is engaged with rack 108 which is secured to the track 36 through mounting brackets 110 and 112. The pinion 98 is held in aligned engagement with the rack 108 by means of the saddle member 114 extending over both sides and the bottom of the track 108 and mounted on the pivot pin 100.

In over-all operation of the seat adjuster mechanism 12, when it is desired to move the front of a seat secured to seat supporting member 40 up or down, a switch in the passenger compartment of the vehicle in which the seat adjuster mechanism 12 is mounted is pressed to actuate the motor 22 in a desired direction and to actuate the solenoid 28 to connect the flexible drive cable 30 to the motor 22 for rotation in a direction to cause the toothed portion 56 of the sector 58 to move clockwise about the pivot mounting pin 60 therefore aided by the counterbalance spring 68. Electric circuits for energizing of the driving apparatus 14 are common and will not therefore be considered in detail herein.

The worm gear 54 is thus driven through the worm 50 by the flexible cable 30 to drive the pinion 42 and in turn pivot the sector 58 about the pivot pin 60 so that the end 62 of the sector 58 moves upward to cause upward movement of the end 64 of the seat supporting member 40 and consequent upward movement of the front of the seat. The lost motion pivot structure 66 at this time prevents binding of the sector 58 and supporting member 40 due to their different pivot axes on movement in an upward arc.

Rotation of the flexible cable 30 in an opposite direction will obviously produce downward movement of the seat through movement of the sector 58 in a counterclockwise direction.

Exactly similar operation will produce up and down movement of the end 92 of the seat supporting member 40 on driving of the flexible cable 32 in opposite directions. Thus counterclockwise rotation of the sector 84 about the pivot pin 86 will produce upward movement of the end 92 of supporting member 40, while clockwise movement of the sector 84 will produce downward movement of the end 92. In this operation the lost motion pivot structure 66 again prevents binding between the sector 84 and the seat supporting member 40 so that the pivot pin 90 need not be connected in a lost motion connection.

In a similar manner the pinion 98 is rotated in opposite directions on driving the flexible cable 34 in opposite directions through the worm 102 and worm gear 104. Clockwise movement of the pinion 98 will cause backward moving of a seat supported on the seat supporting member 40, while counterclockwise movement of the pinion 98 will produce forward movement of the seat supporting member 40 due to movement of the slide on which the pinion is supported along the track on which the rack is supported.

While one embodiment of the present invention has been considered in detail, it will be understood that other embodiments and modifications are contemplated. It is the intention to include all such embodiments and modifications as are defined by the appended claims within the scope of the invention.

What I claim as my invention is:

1. In seat adjuster mechanism, mechanical structure for moving a seat in a plurality of different directions including an elongated seat supporting member, a second elongated member over which the seat supporting member is variably positioned, vertically extending spaced apart bracket members positioned on said second member at each end thereof, a separate lever centrally pivotally mounted between the brackets at each end of the second member, one end of one of said levers being directly pivotally connected to one end of the seat supporting member, a lost motion pivot connection connecting one end of the other of said levers to the other end of the seat supporting member, a toothed sector on the other end of each of the levers, pinions extending transversely of the seat supporting and second members rotatably connected between the vertically extending bracket members in mesh with the toothed sectors, and means connected to the pinions for selectively rotating the pinions.

2. Structure as set forth in claim 1 and further including a pin secured to the other end of said one of said levers and extending transversely thereof and a spiral spring one end of which is secured to the pivot mounting of the said one lever wrapped around the pivot mounting a plurality of times and the other end of which is positioned over the pin.

3. Structure as set forth in claim 1 and further including a pin secured to the other end of the said other of said levers extending transversely thereof and a spiral spring one end of which is secured to the pivot mounting of the said one lever wrapped around the pivot mounting a plurality of times and the other end of which is positioned over the pin.

4. Structure as set forth in claim 1 and further including a track positioned beneath the second elongated member along which the second elongated member is positioned, a bracket positioned centrally of the second elongated member, a rack secured to the track longitudinally thereof, a third pinion extending transversely of the rack and rotatably connected to the centrally positioned bracket in engagement with the rack through said second elongated member, means securing the pinion in mesh with said rack and means connected with the third pinion for selectively rotating the third pinion.

5. Structure as set forth in claim 4 wherein the means for securing the third pinion in mesh with said rack includes a U-shaped bracket the ends of which are rotatably mounted on the axis of rotation of the third pinion and which extends along the two ends of the pinion and beneath the rack.

6. In seat adjuster mechanism, mechanical structure for moving a seat in a plurality of different directions including an elongated seat supporting member, a track positioned beneath said seat supporting member, a slide on said track over which the seat supporting member is variably positioned, vertically extending spaced apart bracket members positioned on said slide at each end thereof, a separate lever centrally pivotally mounted between the brackets at each end of the slide, one end of one of said levers being directly pivotally connected to one end of the seat supporting member, a lost motion pivot connection connecting one end of the other of said levers to the other end of the seat supporting member, a toothed sector on the other end of each of the levers, pinions extending transversely of the seat supporting and second members rotatably connected between the vertically extending bracket members in mesh with the toothed sectors, means connected to the pinions for selectively rotating the pinions, a rack rigidly secured to said track, a bracket secured to the slide centrally thereof, a pinion extending axially transversely of the slide rotatably mounted on the centrally located bracket in mesh with said rack through said slide and means for securing the pinion in engagement with the rack.

7. Structure as set forth in claim 6 and further including a pin secured to the lever at the one end of the seat supporting member and extending transversely thereof from the sector end of the lever and a spiral spring one end of which is secured to the pivot mounting of the lever wrapped around the pivot mounting a plurality of times and the other end of which is positioned over the pin.

8. Structure as set forth in claim 6 and further including a pin secured to the lever at the other end of the seat supporting member and extending transversely thereof from the sector end of the lever and a spiral spring one end of which is secured to the pivot mounting of the lever wrapped around the pivot mounting a plurality of times and the other end of which is positioned over the pin.

9. Structure as set forth in claim 6 wherein the means for securing the pinion in engagement with the rack comprises a U-shaped member pivotally mounted on the axis of rotation of the pinion receiving the lower portion of said pinion and extending on both sides of and beneath the rack.

10. Seat adjuster mechanism comprising a reversible electric motor, clutch structure including three flexible drive cables extending from each side thereof and means for selectively connecting the motor to the drive cables for driving the cables in opposite directions and mechanical structure positioned at each side of a seat to be adjusted, each including a track secured to a fixed support, a slide movable along said track, a seat supporting member positioned above the slide for supporting a seat to be adjusted, a first lever pivotally mounted centrally to the slide adjacent the front of the seat supporting member, a lost motion pivot connection between one end of the lever and the front end of the seat supporting member, a toothed sector on the other end of the lever, a pin secured to said lever adjacent the other end thereof, a pinion in engagement with said toothed sector, a worm gear secured to the pinion for rotation therewith, a worm engaged with the worm gear for rotation thereof and itself connected to one of the flexible cables from the clutch structure for rotation thereby in opposite directions and a counterbalance spring mounted at one end on the pivot mounting of the lever and engaged with the pin on the lever at the other end for biasing the front of the seat adjusting member in an upward direction, a second lever at the rear of the seat supporting member pivotally connected to the slide centrally, pivotally connected to the rear end of the seat supporting member at one end thereof and including a toothed sector at the other end thereof, a second pinion supported for rotation on said slide in engagement with the toothed sector of the second lever, a second worm gear secured to said second pinion for rotation therewith and a second worm engaged with said second worm gear for rotation thereof and connected to a second of the flexible cables for rotation thereby, a rack rigidly secured to the track, a third pinion engaged with said rack, a third worm gear connected to said third pinion for rotation therewith, a third worm engaged with said worm gear and itself rotatable in opposite directions by the third of the flexible cables and a U-shaped member pivotally supported at the axis of rotation of the third pinion and extending over the lower half of the third pinion and the sides and bottom of said rack.

References Cited
UNITED STATES PATENTS

| | | | |
|---|---|---|---|
| 1,878,796 | 9/1932 | Morse et al. | 74—91 |
| 2,119,399 | 5/1938 | Muschong | 74—91 |
| 2,907,371 | 10/1959 | Scott | 248—419 |
| 2,924,265 | 2/1960 | Himka | 248—394 X |
| 3,081,973 | 3/1963 | Arlauskas et al. | 248—393 |
| 3,125,318 | 3/1964 | Lohr et al. | 248—419 |

ROY D. FRAZIER, *Primary Examiner.*

CLAUDE A. LE ROY, MILTON KAUFMAN,
*Examiners.*

R. P. SEITTER, D. H. THIEL, *Assistant Examiners.*